(12) United States Patent
Larsen et al.

(10) Patent No.: US 7,812,473 B2
(45) Date of Patent: Oct. 12, 2010

(54) AUXILIARY COMPONENT CONTROL FOR USE WITH A LAWN AND GARDEN TRACTOR

(75) Inventors: Scott Larsen, Twinsburg, OH (US);
Dennis Davis, Chagrin Falls, OH (US);
David A. Straka, Hudson, OH (US)

(73) Assignee: Delta Systems, Inc., Streetsboro, OH (US)

( * ) Notice: Subject to any disclaimer, the term of this patent is extended or adjusted under 35 U.S.C. 154(b) by 322 days.

(21) Appl. No.: 11/870,487

(22) Filed: Oct. 11, 2007

(65) Prior Publication Data

US 2009/0121545 A1    May 14, 2009

(51) Int. Cl.
*B60L 3/00* (2006.01)
*F02B 77/08* (2006.01)

(52) U.S. Cl. .................... 307/10.1; 123/198 D
(58) Field of Classification Search .............. 307/9.1, 307/10.1, 10.6; 123/198 R, 198 D
See application file for complete search history.

(56) References Cited

U.S. PATENT DOCUMENTS

| | | | | |
|---|---|---|---|---|
| 4,902,956 A | * | 2/1990 | Sloan | 320/135 |
| 5,327,068 A | * | 7/1994 | Lendrum et al. | 320/136 |
| 5,616,964 A | * | 4/1997 | Peterson, Jr. | 307/9.1 |
| 5,693,986 A | * | 12/1997 | Vettraino et al. | 307/10.7 |
| 5,949,157 A | * | 9/1999 | Hirzel | 307/116 |
| 6,066,899 A | * | 5/2000 | Rund et al. | 307/10.7 |
| 6,377,168 B1 | | 4/2002 | Harvey | |
| 6,609,357 B1 | * | 8/2003 | Davis et al. | 56/10.2 A |
| 7,154,814 B2 | | 12/2006 | Straka | |

\* cited by examiner

*Primary Examiner*—Albert W Paladini
(74) *Attorney, Agent, or Firm*—Tarolli, Sundheim, Covell & Tummino LLP

(57) ABSTRACT

A controller including a controller input coupled to an engine magneto for monitoring tractor engine operation by monitoring a change in magneto signal thereby determining if the engine is running. A power output circuit coupled to an output from the controller draws current from a tractor battery for powering an auxiliary component when the tractor engine is running and disrupts power to the auxiliary component when the tractor engine is not running to conserve battery life.

15 Claims, 4 Drawing Sheets ured allows fuel to flow

AUXILIARY COMPONENT CONTROL FOR USE WITH A LAWN AND GARDEN TRACTOR

FIELD OF THE INVENTION

The present disclosure relates generally to a control for power equipment, and in particular, the present disclosure concerns a control for a lawn and garden tractor.

BACKGROUND

Power equipment that includes for example, lawn and garden tractors are typically provided with a display unit, indicating to the operator different parameters relating to the performance of the power equipment. The display units are usually positioned on the dash panel of the power equipment, conveniently within the operator's viewing area.

U.S. Pat. No. 6,377,168 concerns a magneto sensing hourmeter and is assigned to the assignee of the present invention. A timing circuit provides an output to a microcontroller indicating whether an engine is operating. The circuit includes a triac coupled to a magneto for switching output generating circuitry between an engine on condition to an engine off condition in response to an operating condition of the engine. The output generating circuitry provides a signal indicating that the engine is not operating to the microcontroller when the circuitry is in an engine off condition and provides a signal indicating that the engine is operating to the microcontroller when the circuitry is in an engine on condition.

U.S. Pat. No. 6,609,357 discloses a programmable controller for monitoring a mower/tractor status. The controller includes an interface for monitoring inputs relating to a status of the mower/tractor and controlling outputs that regulate operation of the mower/tractor. The controller also includes a memory for storing instructions to implement a control over operation of the mower/tractor. The instructions include instructions for determining a safety status condition based on sensed inputs and outputting a signal from the interface of the controller that inhibits operation of a lawn mower/tractor motor or engine in response to a determination of the safety status condition. The disclosure of these two patents (U.S. Pat. Nos. 6,377,168 and 6,609,357) is incorporated herein by reference.

SUMMARY

An exemplary system is for use with a lawn and garden tractor. A disclosed control monitors engine operation and helps save battery life by deactivating one or more auxiliary operated lawn and garden components when the engine is not running, regardless of whether the ignition switch is in the run or off position.

A controller includes a controller input coupled to an engine magneto for monitoring tractor engine operation by monitoring a change in magneto signal thereby determining if the engine is running. A power output circuit coupled to an output from the controller draws current from a tractor battery for powering an auxiliary component when the tractor engine is running and disrupts power to the auxiliary component when the tractor engine is not running to conserve battery life.

Examples of such auxiliary device are a fuel solenoid, relays, auxiliary power receptacle, electric PTO clutch, and headlights.

These and other features of the invention will become further understood from the following description of an exemplary system which is described in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which.

DETAILED DESCRIPTION OF THE DRAWINGS AND PREFERRED EMBODIMENTS

Figure 1:
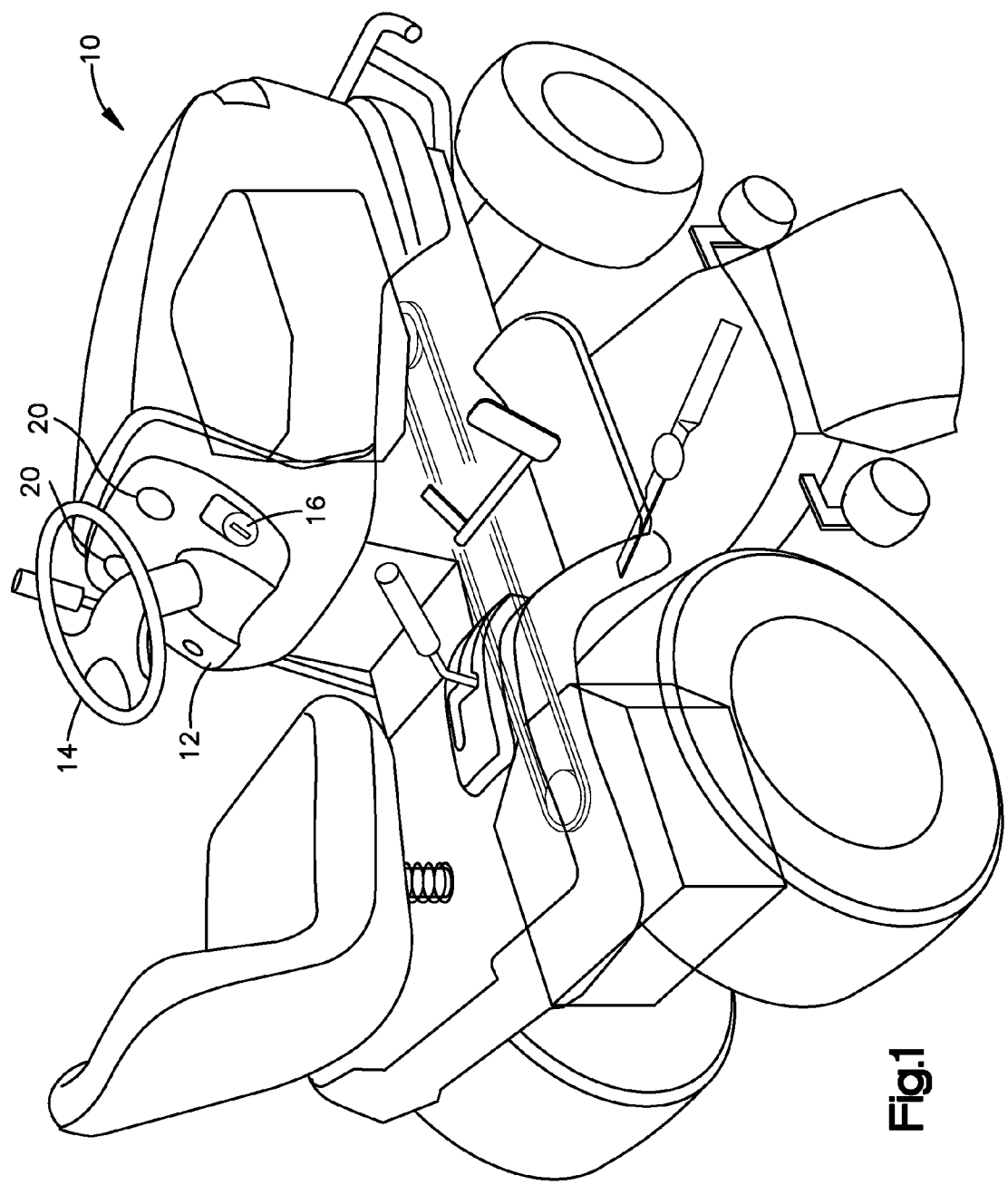
FIG. 1 is an illustration of a lawn and garden tractor.

With reference now to the figures and in particular to FIG. 1, a lawn tractor 10 is illustrated having an instrument panel 12 positioned behind a steering wheel 14 for operating the directional control of the lawn tractor. The instrument panel 12 includes an ignition switch 16 for starting the lawn tractor 10 and one or more indicator display modules 20. While a lawn tractor 10 is shown, the indicator display modules 20 can be used on any motorized land or marine vehicles, or any type of power equipment without departing from the spirit and scope of the claimed invention.

Figure 2:
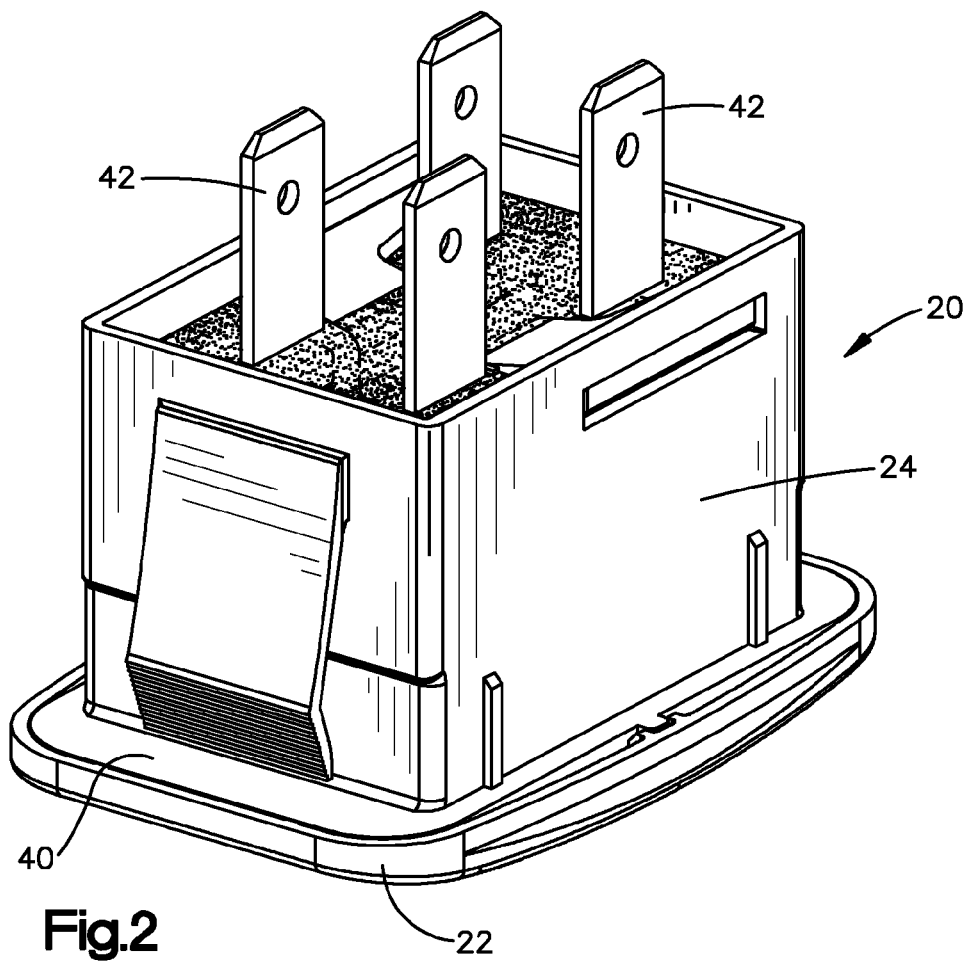
FIG. 2 is a perspective view of an indicator display module constructed in accordance with one exemplary embodiment.
Figure 3:
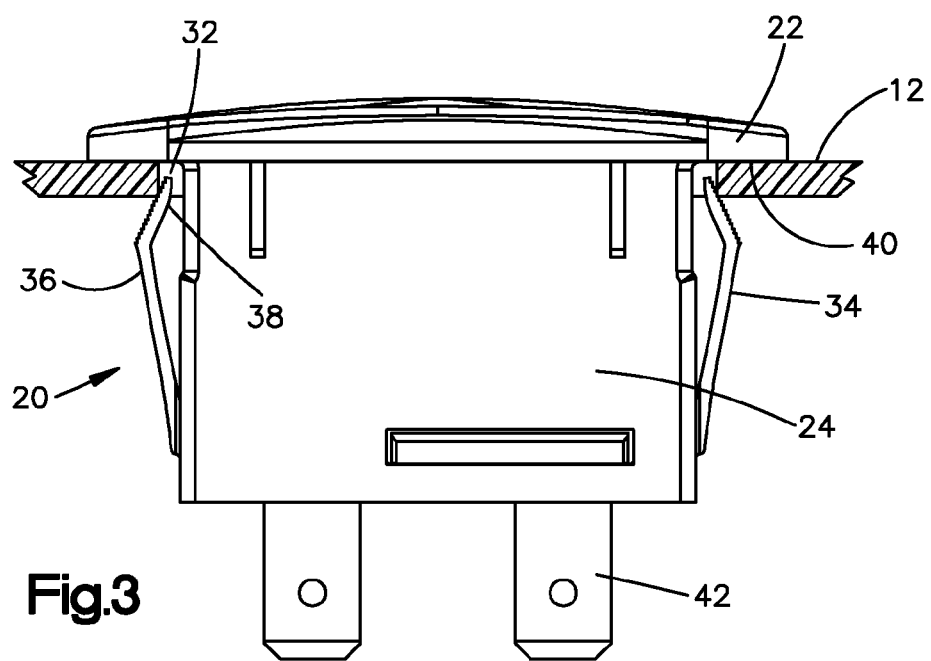
FIG. 3 is an elevated side view of the indicator display module of FIG. 2.

FIGS. 2 and 3 depict an indicator display module 20 constructed in accordance with an example embodiment. The display module 20 is similarly constructed as the display modules illustrated in FIG. 1. FIG. 2 illustrates a perspective view of the display module 20, while FIG. 3 is a side elevation view of the display module, showing the module mounted to the instrument panel 12.

The display module 20 is secured to the instrument panel 12 by passing a module housing 24 through an opening 32 in the instrument panel. Upon passing of the display module 20 through the opening 32, first and second snap wings 34, 36 respectively, spring outward from a deflected position (as they pass through the opening 32) to a securing position for holding the display module by ends 38, as illustrated in FIG. 3. The snap wings 34, 36 apply pressure at their ends 38 between the instrument panel 12 and a rear face 40 of a bezel 22.

Prior to the insertion of the indicator display module 20 into the instrument panel 12, a wiring harness (not shown) is attached to terminals 42 that provide power and communications to an electronic hourmeter discussed below. A preassembly process of the components illustrated in FIG. 4 mounted to a circuit board is potted in the indicator display module housing 24 prior to its insertion into the instrument panel 12.

The housing bezel 22 includes an hour meter window for displaying the number of hours the equipment is used. Other indicators could provide other information to the operator. The exemplary hour meter has five seven segment numerals for displaying engine run time in increments of hours and $1/10$ s of a hour.

Figure 4A:
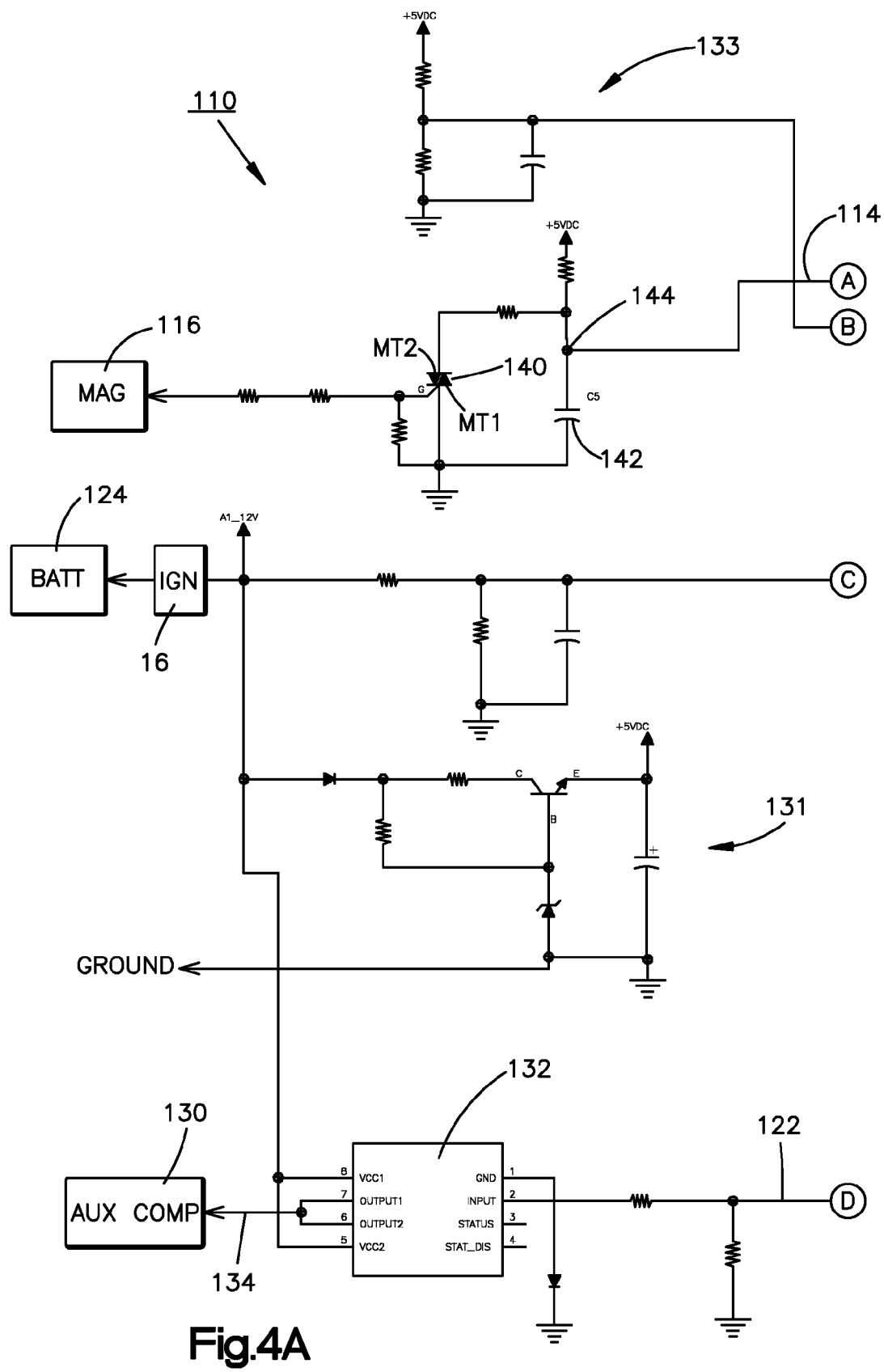
FIGS. 4A and 4B is circuit schematic of an exemplary control.
Figure 4B:
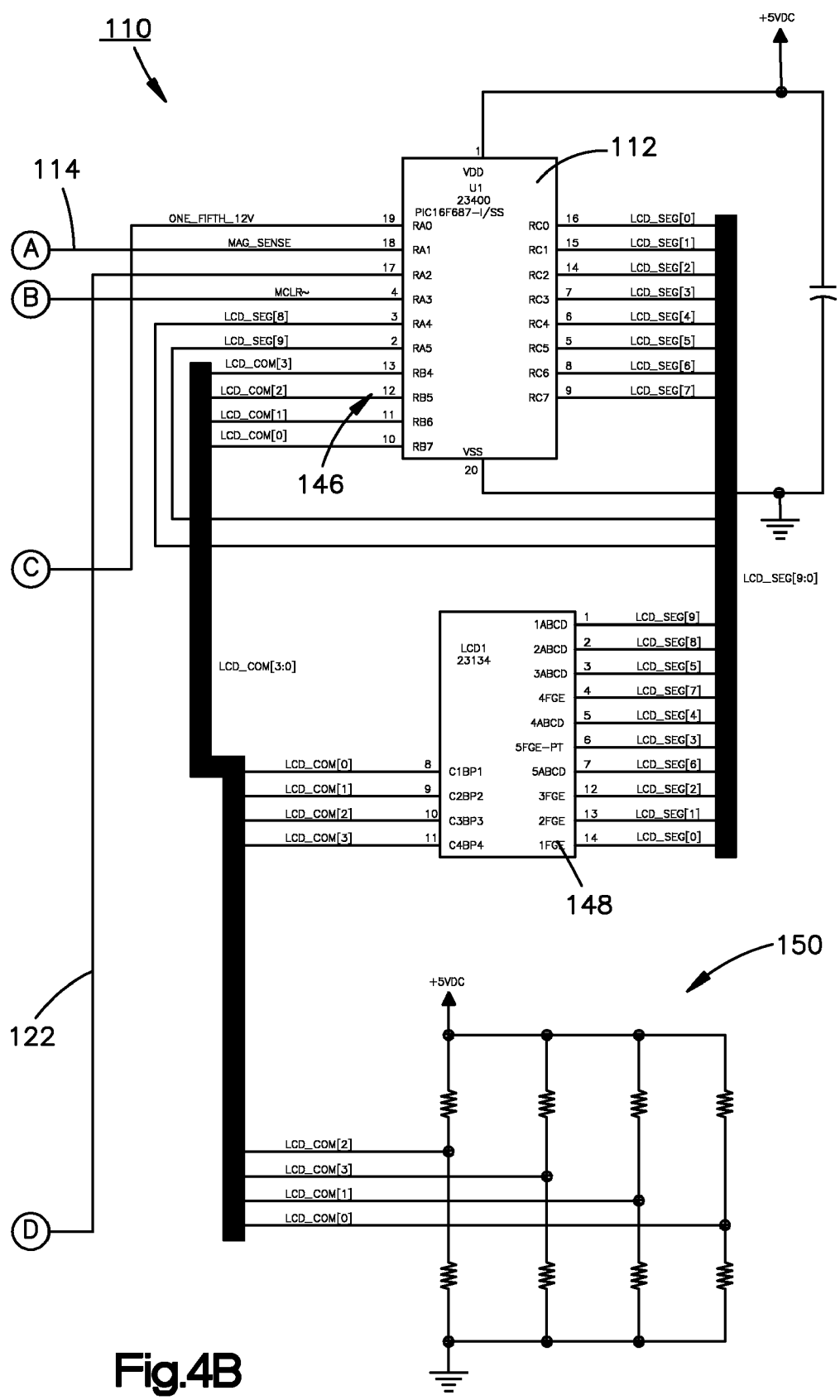

An exemplary circuit 110 shown in FIGS. 4A and 4B implements an hour meter for use with a lawn and garden tractor. A disclosed circuit 110 monitors engine operation and helps save battery life by deactivating one or more auxiliary operated lawn and garden components. One such component is a fuel solenoid that, when energized allows fuel to flow through a valve (not shown) to the engine.

A controller 112 (FIG. 4B) has a controller input 114 coupled to an engine magneto 116 for monitoring tractor engine operation by monitoring a change in magneto signal thereby determining if the engine is running. A power output circuit 132 coupled to an output 122 from the controller 112 draws current from a tractor battery 124 for powering an auxiliary component 130 when the tractor engine is running and disrupts power to the auxiliary component when the tractor engine is not running, regardless of the state of the ignition switch, to conserve battery life.

The controller executes a program upon power up that performs standard hourmeter operation such as those disclosed in U.S. Pat. No. 7,154,814. When the ignition switch is turned to run or start, battery voltage is coupled to a power supply 131 and a reset circuit 133 resets the controller. In the exemplary embodiment, the controller is a model PIC16F687 microprocessor commercially available from Microchip.

The controller 112 periodically polls the state of the input 114. When the controller 112 senses a low signal at the input 114 it concludes that there is a magneto signal present and will enable the hourmeter to count. The controller 112 also sets the output 122 to the power output circuit 'high'. This will turn on an output 134 from power output circuit. In the exemplary embodiment this circuit is a protected MOSFET commercially available as part number VN5160S-E from ST Micro. If the signal at the input 114 goes 'high' for 0.5 sec due to an absence of a magneto signal, then the controller disables the hour meter and sets the output 122 low. This will turn off the protected MOSFET output 134.

The triac 140 produces a low signal at a junction 144 when triggered at the control gate by a magneto that generates either a positive or negative pulse. An RC circuit having a capacitor 142 on the output of the triac extends the time duration of the magneto pulse so that the controller can accurately sample the signal at a slower rate.

The exemplary system is for use with a lawn tractor having a magneto and fuel solenoid. When the engine is cranked, the magneto signal will provide a signal to the module. The module (which is powered by the 12V battery) will start accumulating time on the hourmeter and the protected output can provide power to the engine's fuel solenoid. If the ignition switch were left in the 'ON' position, the fuel solenoid would not drain the battery when the engine is not running.

Four microprocessor pins 146 are coupled to a LCD display driver 148 and a resistor network 150 coupled to the five volt power supply for applying a bias voltage to the display driver 148.

To start the engine the operator turns the ignition key to the start position and the starter motor cranks the engine, causing the magneto to create pulses even before the engine starts. Sensing the magneto pulses allows the controller 112 (powered once the ignition switch moves to the start position) to react quickly enough to open the fuel valve allowing the engine to start.

Such improvements, changes in positioning, and modifications within the skill of the art are intended to be covered by the appended claims. Further, the invention as a whole has been described with a certain degree of particularity, it should be understood that various changes can be made by those skilled in the art without departing from the scope of the invention hereinafter claimed.

We claim:

1. For use with a lawn and garden tractor, apparatus for monitoring engine operation and saving battery life by deactivating one or more auxiliary operated lawn and garden components comprising:

a) a programmable controller including a controller input coupled to an engine magneto for monitoring tractor engine operation by monitoring a change in magneto signal to determine if the engine is running or cranking; and b) a power output circuit coupled to a control output from the controller and which supplies current from a tractor battery to a auxiliary component;

c) said controller providing one signal to the power output circuit when the tractor engine is running or cranking and providing a second signal different from said one signal for disrupting power to the auxiliary component from said battery when the tractor engine is not running or cranking to conserve battery life.

2. The apparatus of claim 1 additionally comprising a fuel solenoid for opening and closing a valve that delivers fuel to a lawn and garden tractor engine which is energized by the battery via the power output circuit.

3. The apparatus of claim 1 further comprising conditioning circuitry for lengthening pulses from the magneto for coupling to the programmable controller.

4. The apparatus of claim 3 wherein the conditioning circuitry comprises an RC charging circuit.

5. The apparatus of claim 1 wherein the programmable controller that monitors engine run time and includes a memory for storing accumulated run time.

6. The apparatus of claim 5 wherein the programmable controller also drives a display for displaying to a user accumulated run time.

7. For use with a lawn and garden tractor, a method of monitoring engine operation and saving battery life by deactivating one or more auxiliary operated lawn and garden components comprising:

a) providing a programmable controller including a controller input and coupling the controller input to an engine magneto for monitoring tractor engine operation by monitoring a change in magneto signal to determine if the engine is running or cranking;

b) coupling a power output circuit to an output from the programmable controller to controllably maintain and disrupt power from a battery to an auxiliary component based on the states of the output;

c) providing current from a tractor battery through the power output circuit to an auxiliary component when the tractor engine is running or cranking by coupling one signal at the output to the power output circuit; and d) disrupting power to the auxiliary component when the tractor engine is not running or cranking by providing a second signal different from said one signal at the output to the output circuit to conserve battery life.

8. The method of claim 7 wherein the auxiliary component is a fuel solenoid and wherein the programmable controller activates the fuel solenoid to deliver fuel to the engine when a starter motor is cranking the engine to start the engine.

9. The method of claim 8 wherein the starter motor cranking creates magneto pulses that are sensed by the controller.

10. The method of claim 7 wherein the controller is a programmable controller having a memory and wherein accumulated engine run time is stored in said memory.

11. The method of claim 10 wherein accumulated run time is displayed on a visual display.

12. The method of claim 7 additionally comprising conditioning signals from the magneto by lengthening pulses from the magneto and coupling conditioned signals to the programmable controller.

13. For use with a lawn and garden tractor, apparatus comprising:

a) a controller including a controller input coupled to an engine magneto for monitoring tractor engine operation by monitoring a change in magneto signal to determine if the engine is cranking; and b) a power output circuit coupled to a control output from the controller and which supplies current from a tractor battery to a fuel solenoid; and c) a fuel solenoid powered by the battery by means of a connection through the power output circuit;

d) said controller providing one signal to the power output circuit when the tractor engine is cranking to energize the fuel solenoid and providing a second signal different from said one signal for disrupting power to the fuel solenoid from said battery when the tractor engine is not cranking.

14. For use with a lawn and garden tractor, a method of monitoring engine operation and activating and deactivating a fuel solenoid comprising:

a) providing a controller including a controller input and coupling the controller input to an engine magneto for monitoring tractor engine operation by monitoring a change in magneto signal to determine if the engine is cranking; and b) coupling a power output circuit to an output from the controller; and c) providing current from a tractor battery through the power output circuit to a fuel solenoid when the tractor engine is cranking to allow starting of the engine and disrupting power to the fuel solenoid when the tractor engine is not cranking.

15. For use with a lawn and garden tractor, apparatus for monitoring engine operation and saving battery life by controllably deactivating a tractor fuel valve comprising:

a) a programmable controller including a controller input coupled to an engine magneto for monitoring tractor engine operation by monitoring magneto pulses to determine if the engine is running or cranking; said programmable controller including a timer for monitoring periods of engine running or cranking and a memory for accumulating said periods;

b) a conditioning circuit for lengthening magnet pulses that is coupled to the controller input;

c) a display for indicating accumulated time periods based on the monitoring of tractor engine operation; and d) a power output circuit coupled to a control output from the programmable controller which controls current flow from a tractor battery to a fuel solenoid for controlling a state of the tractor fuel valve;

e) said controller providing a signal to the power output circuit to open the fuel valve to allow starting and operation of the tractor in response to monitoring of tractor engine operation.

* * * * *